United States Patent
Eubanks et al.

(10) Patent No.: US 8,250,225 B1
(45) Date of Patent: Aug. 21, 2012

(54) GENERATION OF SUFFIXES FOR PSEUDO E-MAIL ADDRESSES

(75) Inventors: Donald A. Eubanks, Dallas, TX (US); Robert Matthew Barnett, Dallas, TX (US); Douglas L. Peckover, Dallas, TX (US); Harold Hutson Carspecken, III, Dallas, TX (US)

(73) Assignee: Paradox Technical Solutions LLC, Wilmington, DE (US)

( * ) Notice: Subject to any disclaimer, the term of this patent is extended or adjusted under 35 U.S.C. 154(b) by 2256 days.

(21) Appl. No.: 10/966,361

(22) Filed: Oct. 15, 2004
(Under 37 CFR 1.47)

Related U.S. Application Data (63) Continuation-in-part of application No. 10/965,700, filed on Oct. 14, 2004.

(60) Provisional application No. 60/511,718, filed on Oct. 14, 2003.

(51) Int. Cl.
*G06F 15/16* (2006.01)
*G06F 17/30* (2006.01)
*H04N 7/16* (2011.01)

(52) U.S. Cl. .......... 709/229; 709/206; 709/207; 726/26; 726/27

(58) Field of Classification Search .................. 709/206, 709/207, 229; 713/100; 726/26–33
See application file for complete search history.

(56) References Cited

U.S. PATENT DOCUMENTS

| | | | |
|---|---|---|---|
| 5,068,894 A | 11/1991 | Hoppe | |
| 5,649,118 A | 7/1997 | Carlisle et al. | |
| 5,710,889 A | 1/1998 | Clark et al. | |
| 5,873,072 A | 2/1999 | Kight et al. | |
| 5,956,521 A | 9/1999 | Wang | |
| 6,192,380 B1 | 2/2001 | Light et al. | |
| 6,609,654 B1 | 8/2003 | Anderson et al. | |
| 6,970,852 B1 | 11/2005 | Sendo et al. | |
| 6,980,969 B1 | 12/2005 | Tuchler et al. | |
| 6,983,882 B2 | 1/2006 | Cassone | |
| 7,039,440 B2 | 5/2006 | Rodriguez et al. | |
| 7,136,835 B1 | 11/2006 | Flitcroft et al. | |
| 7,242,921 B2 | 7/2007 | Sullivan et al. | |
| 7,246,235 B2 | 7/2007 | Ellison et al. | |
| 7,263,607 B2 * | 8/2007 | Ingerman et al. | 713/150 |
| 7,412,422 B2 | 8/2008 | Shiloh | |
| 7,461,397 B2 * | 12/2008 | Karamchedu et al. | 726/6 |

(Continued)

FOREIGN PATENT DOCUMENTS

WO 9949424 9/1999

(Continued)

OTHER PUBLICATIONS

U.S. Appl. No. 10/967,019, filed Oct. 15, 2004.

(Continued)

*Primary Examiner* — Peling Shaw
*Assistant Examiner* — Carlos Perez Toro (57) ABSTRACT

An electronic system provides a plurality of address components arranged in a plurality of mutually exclusive groups, and maintains for each of a plurality of electronic network users a respective group assignment specifying one of the groups that is determined by assignment criteria. Each such group assignment can change over time as a function of the assignment criteria, and the assignment criteria is configured so that every user is initially assigned to a predetermined one of the groups. The electronic system allocates to each user over time a sequence of address components from the group specified by the current group assignment of that user.

26 Claims, 4 Drawing Sheets

U.S. PATENT DOCUMENTS

| | | | |
|---|---|---|---|
| 2001/0011250 A1* | 8/2001 | Paltenghe et al. | 705/41 |
| 2001/0029485 A1 | 10/2001 | Brody et al. | |
| 2001/0029496 A1 | 10/2001 | Otto et al. | |
| 2001/0032192 A1 | 10/2001 | Putta et al. | |
| 2001/0039535 A1 | 11/2001 | Tsiounis et al. | |
| 2001/0044787 A1 | 11/2001 | Schwartz et al. | |
| 2002/0120559 A1 | 8/2002 | O'Mara et al. | |
| 2003/0028481 A1 | 2/2003 | Flitcroft et al. | |
| 2003/0204619 A1 | 10/2003 | Bays | |
| 2004/0049478 A1* | 3/2004 | Jasper et al. | 707/1 |
| 2004/0111751 A1 | 6/2004 | Tsuria | |
| 2004/0236819 A1 | 11/2004 | Anati et al. | |
| 2005/0125343 A1 | 6/2005 | Mendelovich | |
| 2006/0026098 A1 | 2/2006 | Peckover et al. | |
| 2007/0005762 A1* | 1/2007 | Knox et al. | 709/224 |
| 2008/0306835 A1 | 12/2008 | Agura et al. | |

FOREIGN PATENT DOCUMENTS

| | | |
|---|---|---|
| WO | 9966428 | 12/1999 |

OTHER PUBLICATIONS

U.S. Appl. No. 10/967,021, filed Oct. 15, 2004.

Non-Final Office Action; U.S. Appl. No. 10/967,019; Dated Jul. 31, 2008.

Non-Final Rejection; U.S. Appl. No. 10/965,700; Mailed Mar. 18, 2008.

Response to Non-Final Rejection; U.S. Appl. No. 10/965,700; Filed May 16, 2008.

Final Rejection; U.S. Appl. No. 10/965,700; Mailed Aug. 22, 2008.

U.S. Appl. No. 10/965,700, filed Oct. 14, 2004.

Restriction Requirement; U.S. Appl. No. 10/967,019; Mailed Mar. 18, 2008.

Response to Restriction Requirement; U.S. Appl. No. 10/967,019; Filed May 16, 2008.

U.S. Appl. No. 60/581,246, filed Jun. 18, 2004.

Non-Final Rejection; U.S. Appl. No. 11/153,224; Mailed Mar. 5, 2008.

Response to Non-Final Rejection; U.S. Appl. No. 11/153,224; Filed Jul. 3, 2008.

Peter Wayner's article "A Tool for Anonymity on the Internet", The New York Times, Dec. 16, 1999, p. G.17.

Make Way for the Smart Cards. (Mar. 2003). Topics Magazine, 4 pages.

* cited by examiner

| 100 SUFFIX THREADS | | | EXPERIMENTAL AVERAGE | THEORETICAL MINIMUM | EXPERIMENTAL MINIMUM | EXPERIMENTAL MAXIMUM |
|---|---|---|---|---|---|---|
| LOW ZONE | MEDIUM ZONE | HIGH ZONE | | | | |
| 33 | 34 | 33 | 171 | 34 | 82 | 505 |
| 20 | 35 | 45 | 206 | 45 | 97 | 635 |
| 10 | 30 | 60 | 282 | 60 | 124 | 950 |
| 5 | 25 | 70 | 337 | 70 | 162 | 922 |

GENERATION OF SUFFIXES FOR PSEUDO E-MAIL ADDRESSES

CROSS REFERENCE

This application is a continuation-in-part of U.S. Ser. No. 10/965, 700, filed Oct. 14, 2004 by inventors Douglas L. Peckover et al. and entitled "METHOD AND APPARATUS FACILITATING ELECTRONIC TRANSACTIONS", which claims the priority under 35 U.S.C. §119 of provisional application No. 60/511,718 filed on Oct. 14, 2003.

FIELD OF THE INVENTION

This invention relates in general to techniques for providing pseudo identifiers and, more particularly, to techniques for providing pseudo electronic mail addresses.

BACKGROUND

The last several years have seen progressively increasing interest in and concerns about various rights of privacy. This has been fueled to some extent by the rapid growth and popularity of the Internet. An Internet user, such as a consumer who purchases products or services through the Internet, may be tracked or profiled in a way that the consumer does not intend or desire. For example, over a period of time, the consumer may make several different purchases through the Internet from a given seller. Since these orders will typically all originate from the same e-mail address, the seller can recognize that the orders are related, because of the common e-mail address. The seller can then use this linked information to build a profile, for example regarding the types of products purchased, brand preferences, quality preferences, buying patterns, frequency of orders, and so forth. The seller may even go so far as to use the profile to begin sending the consumer targeted advertisements that are unsolicited and unwanted. To the extent the consumer does not intend or desire that sellers engage in activity such as creating profiles or sending unsolicited advertisements, these types of activities raise privacy issues.

One technique for addressing these concerns is to use a privacy server as a "middleman" between the consumer and the seller. The privacy server generates one or more pseudo e-mail addresses for the consumer. When the consumer wants to communicate with the seller, the consumer sends an e-mail to the privacy server using the consumer's actual e-mail address, and the privacy server then sends that e-mail on to the seller using a pseudo e-mail address. When the seller then responds by sending an e-mail to the pseudo e-mail address, the e-mail is delivered to the pseudo address at the privacy server, and the privacy server then forwards the e-mail on to the actual e-mail address of the consumer.

If the seller sends unsolicited communications, the privacy server may subject them to filtering. For example, the consumer may ask that the privacy server forward only one unsolicited e-mail per week from any other given user. Similarly, when the purchase transaction between the consumer and seller has been completed, the pseudo e-mail address used for that transaction could be deactivated, such that the privacy server would reject or discard any and all communications sent to that pseudo e-mail address, including targeted advertisements. Thus, the consumer would never see these communications. Where the consumer is placing several successive orders with the same seller, the consumer could use a respective different pseudo e-mail address to place each of the orders. Since these orders would not share any common identifying information, it would appear to the seller that they originated from various different users. The seller would thus have no motivation or basis for recognizing that the orders are related or for attempting to develop a single profile based on the multiple orders.

A further consideration here is that there are computer "hackers" who attempt to obtain access to and interfere with computer-related activity of others. In some cases, a hacker engages in this activity simply for the pleasure of taking on the challenge of successfully perpetrating a disruption. In other cases, the hacker is unhappy with the entity operating the targeted computer system, and hopes that a disruption of that system's operation will result in dissatisfaction of the users of that system, and thus bad publicity and/or a reduction in business for that entity. Where the system is an e-mail server, one known approach for attempting disruption is to rapidly transmit a large number of false e-mails to the server, so that they overload the capabilities of the server and prevent it from handling valid e-mail traffic. This is commonly referred to in the industry as a Denial of Service (DoS) attack, because the goal of the hacker is to sufficiently disrupt the normal activity of the server so that other users are denied normal service.

With respect to the generation of pseudo e-mail addresses, there is a need to generate the pseudo addresses in a manner that avoids or at least reduces the likelihood and/or effectiveness of activity such as a DoS attack by a hacker.

BRIEF DESCRIPTION OF THE DRAWINGS

A better understanding of the present invention will be realized from the detailed description that follows, taken in conjunction with the accompanying drawings, in which.

DETAILED DESCRIPTION

Figure 1:
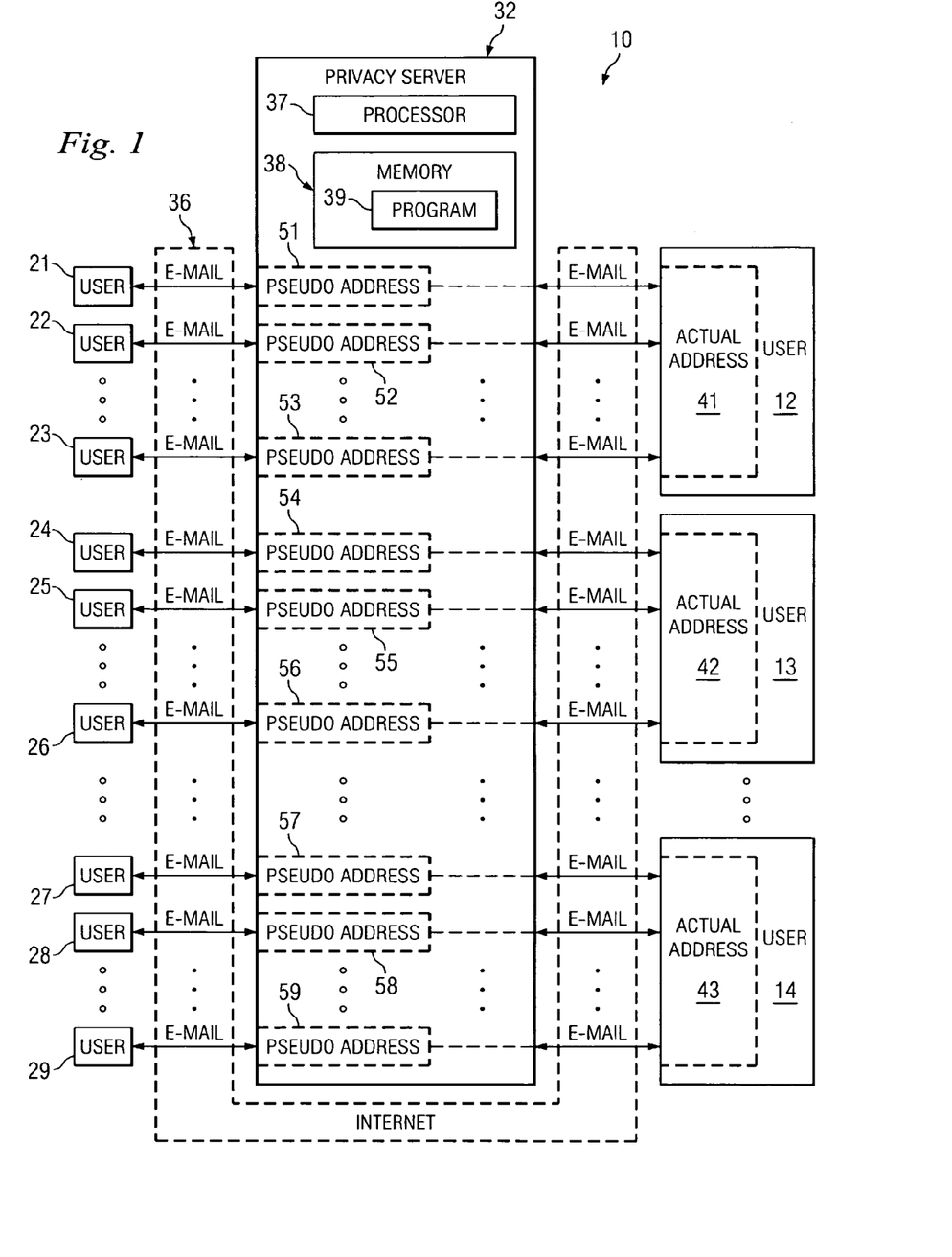
FIG. 1 is a block diagram of an apparatus which is an electronic system, and which embodies aspects of the present invention.

FIG. 1 is a block diagram of an apparatus which is an electronic system 10, and which embodies aspects of the present invention. The system 10 includes a plurality of users 12-14 and 21-29, a privacy server 32, and a portion of the Internet 36 that can facilitate communication between the users and the privacy server. Although the disclosed embodiment uses a network that includes a portion of the Internet 36, the invention is not limited to the Internet, and could be used in association with other types of networks, including corporate networks, private networks, military networks, and so forth.

The privacy server 32 includes a processor 37, which may be any suitable type of processor, and which in the disclosed embodiment is a microprocessor from the X86-family sold by Intel Corporation of Santa Clara, Calif. For example, the processor 37 can be an Intel microprocessor available under the trademark PENTIUM®. The privacy server 32 also includes a memory 38, which in FIG. 1 is shown diagrammatically, and which collectively represents several different types of memory that are present in the privacy server 32. For example, the memory 38 includes a hard disk drive, a "flash" random access memory, a volatile random access memory, a read only memory, and so forth. The memory 38 stores a program 39 that can be executed by the processor.

Users such as those shown at 12-14 and 21-29 may each be one of a natural person, a juridical person and a computer-based device. Where a user is a natural or juridical person, it will be recognized that the user necessarily communicates with the Internet 36 through some form of computer-based device, which is not separately illustrated. However, the user can also be a computer-based device, such as a device that responds to an electronic inquiry by automatically providing a pre-existing document containing information requested by the inquiry. For purposes of the present discussion, it will be assumed that the users 12-14 are each a natural person such as consumer, and that the users 21-29 are each either a juristic person such as a business entity that markets products or services, or a computer-based device operated by such a business entity.

The users 12-14 and 21-29 and the privacy server 32 can communicate among each other using electronic mail (e-mail) messages. In this regard, each of the users 12-14 has an actual e-mail address, as indicated diagrammatically at 41-43. If the user 12 communicates directly by e-mail through the Internet 36 with any of the other users, then that other user will be aware of the actual e-mail address 41 of the user 12. The actual e-mail address 41 is a form of actual identification of the user 12, and can be used by others over time to accumulate information regarding the user 12. For example, if the user 12 places several product orders over a period of time with the business user 21, the business user 21 will be able to recognize that the orders all came from the same actual e-mail address 41, and are thus related orders. The business user 21 can thus begin to develop a profile regarding the user 12 who is associated with the actual address 41. This profile can include information such as product preferences, buying habits, and so forth. Based on this profile information, the business user 21 may even begin to send unsolicited and undesired targeted advertisements directly to the user 12 through the Internet 36, using the actual e-mail address 41 of the user 12.

A purpose of the privacy server 32 is to offer the user 12 an increased level of privacy in relation to other users, such as the user 21. As a practical matter, the privacy server 32 is also capable of optionally providing a reciprocal form of privacy for the user 21. However, for the purpose of simplicity in explaining the present invention, the following discussion focuses on how the privacy of each of the users 12-14 is protected in relation to other users by the program 39 that is executed by the processor 37 in the privacy server 32.

In this regard, and as shown in FIG. 1, e-mail communications traveling between any of the users 12-14 and 21-29 can be routed through the privacy server 32. For this purpose, and at the request of the user 12, the privacy server 13 has generated several pseudo e-mail addresses for the user 12, three of which are indicated diagrammatically at 51-53. When the user 12 wants to communicate with the user 21, the user 12 can send an e-mail to the privacy server 32, which then strips out any occurrences of the actual address 41, and forwards the e-mail to the user 21 from the pseudo address 51. It then appears to the user 21 that the e-mail originated from the pseudo address 51, rather than from the actual address 41. If the user 21 subsequently sends an e-mail reply, it is directed to the pseudo address 51, and is thus routed to the privacy server 32. The privacy server 32 then makes the e-mail available to the user 12, for example by forwarding the e-mail to the actual address 41 of the user 12. Alternatively, the privacy server 32 could hold the e-mail for the user 12, and the user 12 could periodically access the e-mails that the privacy server is holding for the user 12.

If the user 21 attempts to develop profile information regarding the user 12, the profile information will relate to the pseudo address 51, rather than the actual address 41. If the user 21 attempts to send a targeted advertisement by e-mail, the advertisement would go to the pseudo address 51 and thus the privacy server 32, rather than directly to the actual address 41 and the user 12. The privacy server 32 could be configured to quarantine or discard that type of communication, so that the user 12 would either not see those types of communication at all, or would only see them on request. As a further refinement, the user 12 could have the privacy server 32 establish several different pseudo addresses, as indicated at 51-53, and could use a different pseudo address each time that the user 12 made a different purchase from the user 21. In that case, it would be difficult for the user 21 to develop a profile over time, because the purchases would be made using different pseudo addresses, and the user 21 would thus not be able to tell that they actually were related transactions originating from a single user 12.

FIG. 1 reflects that, in a similar manner, the privacy server 32 has established several pseudo e-mail addresses for the user 13, some of which are shown at 54-56. Further, the privacy server has established several pseudo e-mail addresses for the user 14, some of which are shown at 57-59.

One aspect of the present invention relates to the generation of pseudo e-mail addresses, such as those shown diagrammatically at 51-59. In this regard, an e-mail address has three portions. In particular, an e-mail address begins with a character string referred to as the prefix, then has the "@" symbol, and then has a further character string referred to as the suffix or domain name. For example, an e-mail address might be "James21@Privacy01.com", or "xq561zc@vf9h88em3.com". In these examples, the prefixes are "James21" and "xq561zc", and the suffixes are "Privacy01.com" and "vf9h88em3.com".

Due to the highly visible and sensitive nature of the service provided by the privacy server 32, there are persons who may attempt to interfere with the normal operation of the privacy server 32. In this regard, casual computer "hackers" may attempt to disrupt proper operation of the privacy server 32, not necessarily to obtain personal benefit, but instead for the challenge of trying to successfully outsmart the privacy server 32. Alternatively, the hacker may be a person who is experiencing frustration with the fact that the privacy server 32 is protecting the privacy of users such as those shown at 12-14, and/or the fact that privacy server 32 may be blocking some or all communications such as targeted advertisements.

One known form of electronic attack is known in the industry as a Denial of Service (DoS) attack. In this regard, it will be recognized from the foregoing discussion that the privacy server 32 will routinely handle a large volume of e-mail traffic. A user can therefore attempt to flood the privacy server 32 with such a large number of false e-mails that the privacy server 32 becomes overloaded and is prevented from handling normal and valid e-mail traffic. As a result, some or all of the users 12-14 and 21-29 would be denied some or all of the level of service that they would normally expect to receive from the privacy server 32. This may result in complaints and/or bad publicity for the privacy server 32, which in some cases could be the ultimate goal of the hacker initiating the attack.

In order to reduce the likelihood of a successful DoS attack, the privacy server 32 can use a plurality of different registered suffixes, and can spread the pseudo e-mail addresses 51-59 among the various suffixes, so that the pseudo e-mail addresses 51-59 do not all have the same suffix. In that case, in order to maximize the effect of a DoS attack, a hacker would need to discover and attack as many as possible of the multiple suffixes or domain names. The following discussion explains a technique that makes it difficult or impossible for even a clever hacker to discover more than a few of the large number of suffixes being used by the privacy server 32.

Figure 2:
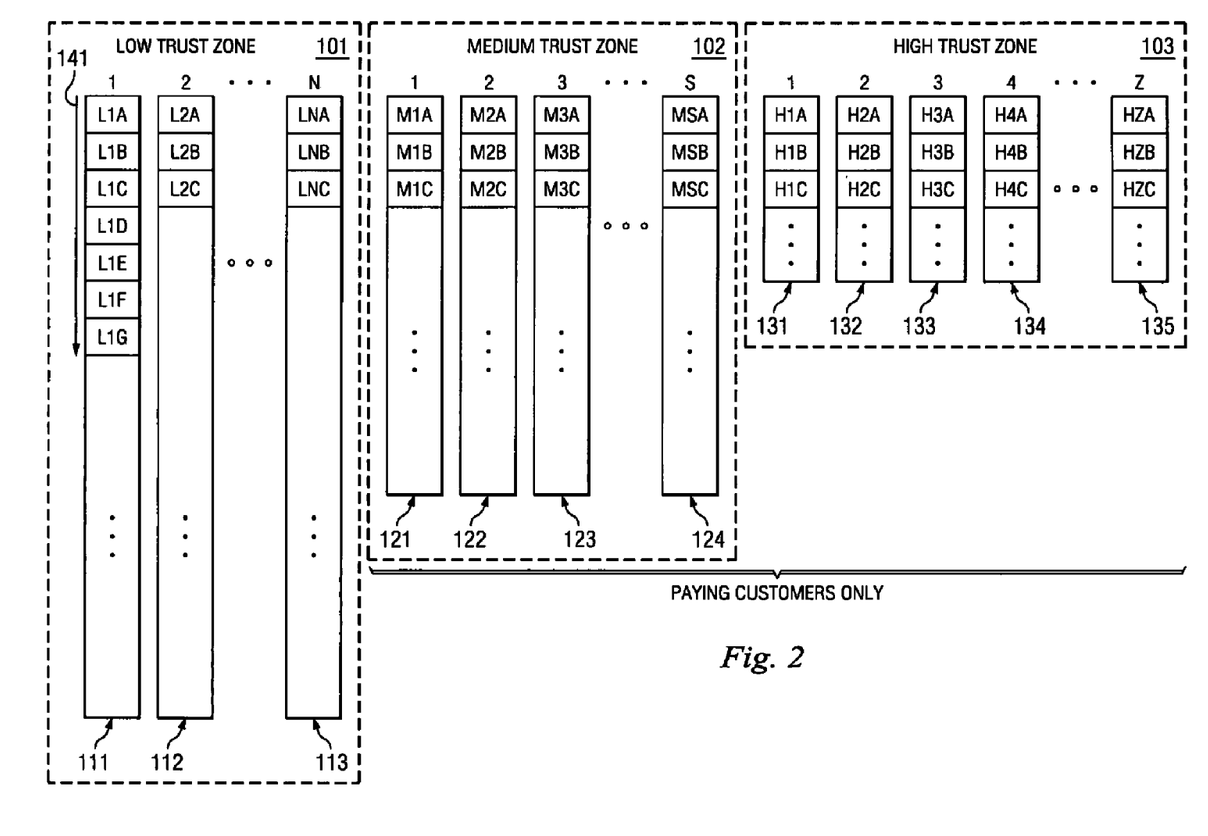
FIG. 2 is a block diagram showing a way in which the electronic system of FIG. 1 organizes a relatively large number of electronic mail suffixes into a plurality of threads.

In this regard, FIG. 2 is a block diagram showing a way of organizing a relatively large number of valid suffixes that have been registered for use by the privacy server 32 of FIG. 1. In particular, these suffixes are organized into three mutually exclusive groups or zones, which are identified diagrammatically in FIG. 2 by broken lines 101-103. As discussed in more detail later, the group 101 is a low trust zone, the group 102 is a medium trust zone, and the group 103 is a high trust zone. The suffixes within the group 101 are organized into "N" different mutually-exclusive suffix threads or sequences, three of which are shown at 111-113. For example, the thread 111 includes, in sequence, suffixes "L1A", "L1B", "L1C", "L1D", and so forth. These suffix names are merely examples, and the actual suffix names would typically be selected so as to avoid any discernable pattern, or even to appear somewhat random. For example, successive suffix names in a thread might be "X18L3G02C", "S48BP2M", and "G51YA0N".

In a similar manner, the suffixes in the group 102 are organized into "S" different suffix threads, four of which are indicated diagrammatically at 121-124. The suffixes in the high trust zone 103 are organized into "Z" different suffix threads, five of which are shown at 131-135. The number of threads S in the medium trust zone 102 is several times the number of threads N in the low trust zone 101. Similarly, the number of threads Z in the high trust zone 103 is several times the number of threads S in the medium trust zone 102. For example, in the disclosed embodiment, S is approximately 3N, and Z is approximately 3S. However, it would be possible to for the numbers of threads in the different zones to conform to other ratios.

The threads 121-124 in the medium trust zone 102 each contain a smaller number of suffixes than the threads 111-113 in the low trust zone 101. Similarly, the threads 131-135 in the high trust zone 103 each contain a smaller number of suffixes than the threads 121-124 in the medium trust zone 102. In the disclosed embodiment, each of the threads 121-124 in the medium trust zone 102 contains about one-half to two-thirds as many suffixes as the threads 111-113 in the low trust zone 101, and each of the threads 131-135 in the high trust zone 103 contains about one-third to one-half as many suffixes as the threads 121-124 in the medium trust zone 102.

Each new user of the privacy server 32 is automatically assigned to the low trust zone 101, and in particular will be assigned to a selected one of the threads 111-113 within the low trust zone 101. Some new users may immediately begin paying for the services provided by the privacy server 32. Others may be offered a short-term trial period, without charge. Non-paying users are automatically prohibited from ever being assigned to either the medium trust zone 102 or the high trust zone 103, as indicated by the bracket in the lower right portion of FIG. 2. On the other hand, paying users may eventually progress from the low trust zone 101 to the medium trust zone 102, and then from the medium trust zone 102 to the high trust zone 103, in a manner described in more detail later.

Within any of the trust zones 101-103, assignment of a given user to one of the threads in that zone may be effected by random selection of a thread, or by assigning the user to the thread currently having the least number of assigned users, in order to provide load balancing. The thread assignment could alternatively involve a combination of these types of factors, or other factors. When a user is assigned to a thread, he or she is placed at the top or beginning of that thread, and then over time is assigned suffixes in the order in which they appear in that thread. In other words, the user would progress downwardly along the string of suffixes in the assigned thread, as indicated diagrammatically by the arrow 141 in FIG. 2. For example, referring to the thread 111 in the low trust zone 101, the user would start from the top of the thread and would initially receive one or more pseudo e-mail addresses having the suffix "L1A". The user might, for example, receive 1, 5, 10, 50 100, or some other number of pseudo e-mail addresses having the same suffix "L1A". After the user had received the specified number of e-mail addresses with the suffix "L1A", the user would then receive one or more pseudo e-mail addresses having the next suffix "L1B".

A user might initially request a relatively large number of pseudo e-mail addresses, and might immediately receive not only a first group of pseudo e-mail addresses with the suffix "L1A", but also a second group of pseudo e-mail addresses with the suffix "L1B", and a third group of pseudo e-mail addresses with the suffix "L1C". Later, when this user made a request for another relatively large group of pseudo e-mail addresses, the user might be given a group of pseudo e-mail addresses with the suffix "L1D", and also a group of pseudo e-mail addresses with the suffix "L1E". But even in this case, it will be noted that the user is progressing sequentially through the suffixes in that user's assigned thread.

Each time that a user reaches the end of his or her currently-assigned thread, the privacy server 32 evaluates whether that user should remain in the same zone, or be moved to a different zone. (This evaluation process is discussed in more detail later). The user is then assigned to the beginning of a thread within either the current zone or the new zone, as appropriate. If the user remains in the same zone, then the user may be assigned to the same thread or to a different thread, depending on the criteria used for selecting a thread. For example, a thread may be selected randomly, and in that case the user could be assigned to either the same thread that the user has just been on, or to a different thread. In a different approach, the selected thread could be the thread that currently has the least number of users assigned to it, in order to effect load balancing. This load balancing approach could also result in the user being assigned to either the same thread that the user has just been on, or to a different thread.

As mentioned above, the low trust zone 101 has a relatively small number of suffix threads, but each thread is relatively long. This reflects an assumption that most malicious users are likely to be relatively new users, and will often not be willing to pay a fee if a free trial period is offered. As mentioned earlier, the medium trust zone 102 and the high trust zone 103 are each restricted to paying users. Consequently, even a very honest and trustworthy user will not be able to move to either the medium trust zone 102 or the high trust zone 103, without first becoming a paying user. But since many malicious users will be unwilling to become paying users, they will never have access to the medium trust zone 102 or the high trust zone 103, and the suffixes in these two trust zones will therefore enjoy a higher degree of protection from DoS attacks than the suffixes in the low trust zone 101.

The medium trust zone 102 is available only to trusted, paying users. The medium trust zone 102 has a significantly larger number of suffix threads than the low trust zone 101, but each thread is shorter. This strategy is used in order to limit the extent to which a "sleeper" user could significantly disrupt the service provided to other paying users. In this regard, a "sleeper" user is a user who has malicious intent, but who patiently and faithfully uses the service over a period of time, in an attempt to identify as many suffixes as possible for the purpose of mounting some form of future attack.

The high trust zone 103 is only available to paying users who are very trusted and loyal. The high trust zone 103 has a very large number of suffix threads, each of which contains a relatively small number of suffixes. The users in the high trust zone 103 enjoy the greatest degree of protection from disruptions such as DoS attacks, because the large number of threads permits the user density per thread to be maintained at a relatively low level. Consequently, even if one thread in the high trust zone 103 is compromised, only a small percentage of all the users in the high trust zone will be on that thread, thereby minimizing the overall effect of the attack.

As discussed above, each time a user reaches the end of the currently-assigned thread, the privacy server 32 evaluates whether to move that user to a different trust zone. In order to facilitate this evaluation, the privacy server 32 calculates a confidence level "CL" for the user. In this regard, when one user provides a pseudo e-mail address to a different user, and the other user then uses that pseudo e-mail address to send an e-mail back to the first user, the two users have established a relationship that is referred to herein as an "active" relationship. An honest and trusted user will obtain pseudo e-mail addresses for the purpose of actually putting them into actual and valid use, and in particular will use them for e-mail communications in active relationships with other separate and independent users. In contrast, the goal of a malicious user is often to simply identify as many suffixes as possible. Therefore, a malicious user will usually have little or no actual use for a pseudo e-mail address once it has been assigned, because the malicious user can identify the suffix as soon as the pseudo e-mail address is assigned. Consequently, the malicious user may not use any of the assigned pseudo e-mail addresses, or may use only a few of them.

With this in mind, the privacy server 32 calculates the confidence level CL according to the following formula:

$$CL = \frac{EA_{AR}}{EA_{TOT}} \times DOMAINS_{AR}$$

where $EA_{TOT}$ is the total number of pseudo e-mail addresses previously assigned to the particular user by the privacy server 32, where $EA_{AR}$ is the number of these e-mail addresses that have been used for an active relationship and have thus received at least one e-mail from some other user, and where $DOMAINS_{AR}$ is the number of different domains or suffixes of other users that have been involved in the active relationships with the user being evaluated.

The first term of this equation determines the percentage of the pseudo e-mail addresses issued to the user that have been used to establish active relationships. The privacy server 32 shows confidence in users that do not unnecessarily request pseudo e-mail addresses. A low percentage in this term is a sign that a user may be trying to gather information for the purpose of mounting some form of attack on the privacy server 32. The second term of the equation is a defense against a specific kind of automated confidence-generation attack, where a user who runs his or her own e-mail system could use that system to generate token e-mails to his or her own pseudo e-mail addresses, in an attempt to artificially boost the active relationship percentage reflected by the first term of the equation. But all of those e-mails would originate from one or from only a few suffixes or domain names, and the second term of the equation would therefore help to counteract an artificially high percentage in the first term. In the disclosed embodiment, users with a confidence level CL below 25 will be restricted to the low trust zone 101, users with a confidence level of 25 to 50 will be considered for the medium trust zone 102, and users with a confidence level above 50 will be considered for the high trust zone 103. Some hypothetical examples will help to illustrate the application of the confidence level calculated using the foregoing equation.

A first hypothetical example involves a good faith user who requests pseudo e-mail addresses and uses them to establish valid active relationships with a variety of Internet Web sites. When a pseudo e-mail address of the user receives back an e-mail from another user in one of these relationships, that pseudo e-mail address is considered to have been used in an active relationship. Assume that, over a period of time, the user in question requests 50 pseudo e-mail addresses, and uses 45 of them on valid relationships. In addition, assume that the user's 45 active relationships involve 40 different suffixes or domain names of other users, due to the fact that the user applied five of the pseudo e-mail addresses to Web sites with which he or she had already established a relationship. The confidence level of this user will thus be CL=(45/50)*40=36. Since this confidence level is between 25 and 50, this user is eligible to be considered for elevation from the low trust zone 101 to the medium trust zone 102.

As a second hypothetical example, assume that a bad faith user intends to initiate a DoS attack on the privacy server 32, and therefore sets out to discover as many as possible of the suffixes used by the privacy server 32. For that purpose, the user creates a program that repeatedly submits requests for pseudo e-mail addresses. In this manner, the user's many requests result in the user receiving 500 pseudo e-mail addresses. Also assume that this user is somewhat clever, and suspects that an e-mail needs to be sent to each of these pseudo e-mail addresses in order to give the false impression that this bad faith user is actually a good faith user. The bad faith user therefore sets up a single privately-owned e-mail server under his or her control, and has this server send one token e-mail each week to each of the 500 pseudo e-mail addresses. This user has thus obtained 500 pseudo e-mail addresses, and has used each of them to create a relationship which appears to be valid and active, but which is actually just a sham. The confidence level for this user is thus CL=(500/500)*1=1. This bad faith user thus has an extremely low confidence level CL. Since this confidence level is below 25, this bad faith user would not be eligible to be considered for elevation from the low trust zone 101 to the medium trust zone 102, even if this user was a paying user.

As a third hypothetical example, assume that another bad faith user takes a bad-faith approach similar to that discussed in the second hypothetical above, except that this bad faith user takes the time to create real and valid relationships using the 500 pseudo e-mail addresses. Assume that these relationships are with 75 other entities, and that these 75 entities generate e-mails reflecting 75 different suffixes or domain names. As mentioned earlier, this type of bad faith user is referred to as a "sleeper". Assume that this bad faith user thus manages to build up a confidence level CL that is sufficient to permit this user to rapidly move to the high trust zone 103, in particular by progressing along one of the threads 111-113 in the low trust zone 101, and then along one of the threads 121-124 in the medium trust zone 102, in order to reach one of threads 131-135 in the high trust zone 103. The result is that this user will have discovered the suffixes on only three of the many suffix threads maintained by the privacy server 32. Consequently, even though the suffixes discovered by this user include some from the medium trust zone 102 and some from the high trust zone 103, the user will have discovered only a very small subset of the total number of suffixes being used by the privacy server 32. In order to discover most or all of the suffixes being used by the privacy server 32, it would take a relatively large number of these bad faith "sleeper" users, who would all need to be cooperating with each other. Moreover, since these bad faith users might not be aware that the suffixes are organized in threads, and in any event would not know how many threads are in each zone, even a group of cooperating bad faith users would have no way of knowing when they had discovered all of the suffix threads, and thus all of the suffixes.

Figure 3:
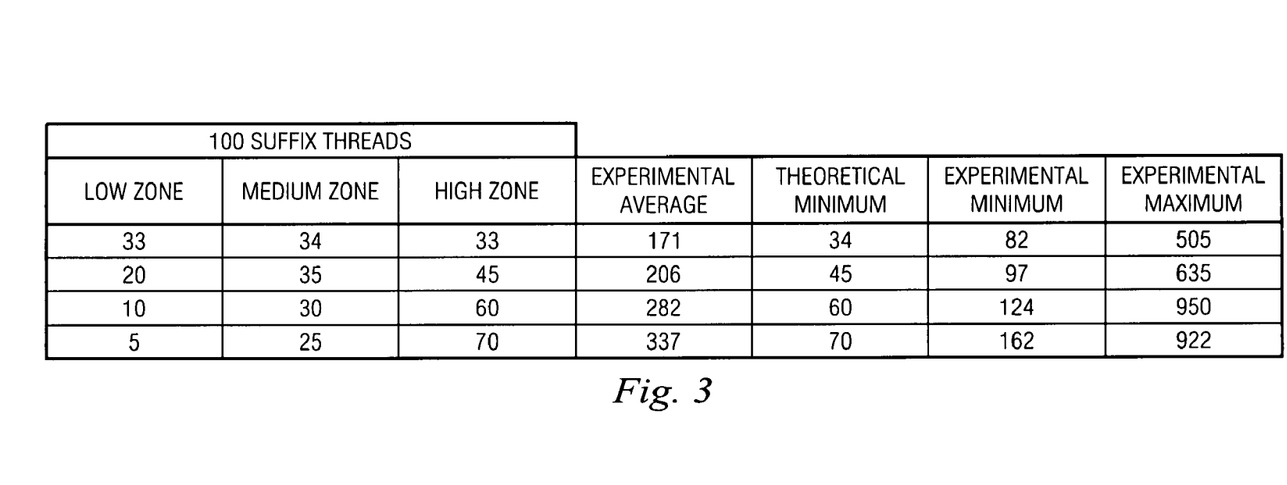
FIG. 3 is a table showing certain experimental data regarding how many people would need to act cooperatively in order to ensure that each suffix thread had been assigned to at least one of these persons.

In this regard, from a statistical perspective, the theoretical minimum number of sleeper users required to discover all threads is the largest number of threads in any one trust zone. Assuming hypothetically that the privacy server 32 had only 100 threads of registered suffixes that could be distributed among the three trust zones, ten thousand hypothetical test cases were run on each of four hypothetical distributions of these 100 suffixes among the three zones. FIG. 3 is a table showing the experimental average, experimental minimum and experimental maximum number of sleeper users needed to discover all of the suffix threads, or in other words to ensure that each of the 100 threads had been assigned to at least one of the sleeper users. It should be apparent from FIG. 3 that the suffix assignment technique used by the privacy server 32 will be very effective in limiting the extent to which even sleeper users can gather useful information regarding suffixes, thereby maximizing the protection provided to trusted users against activity such a DoS attack.

Figure 4:
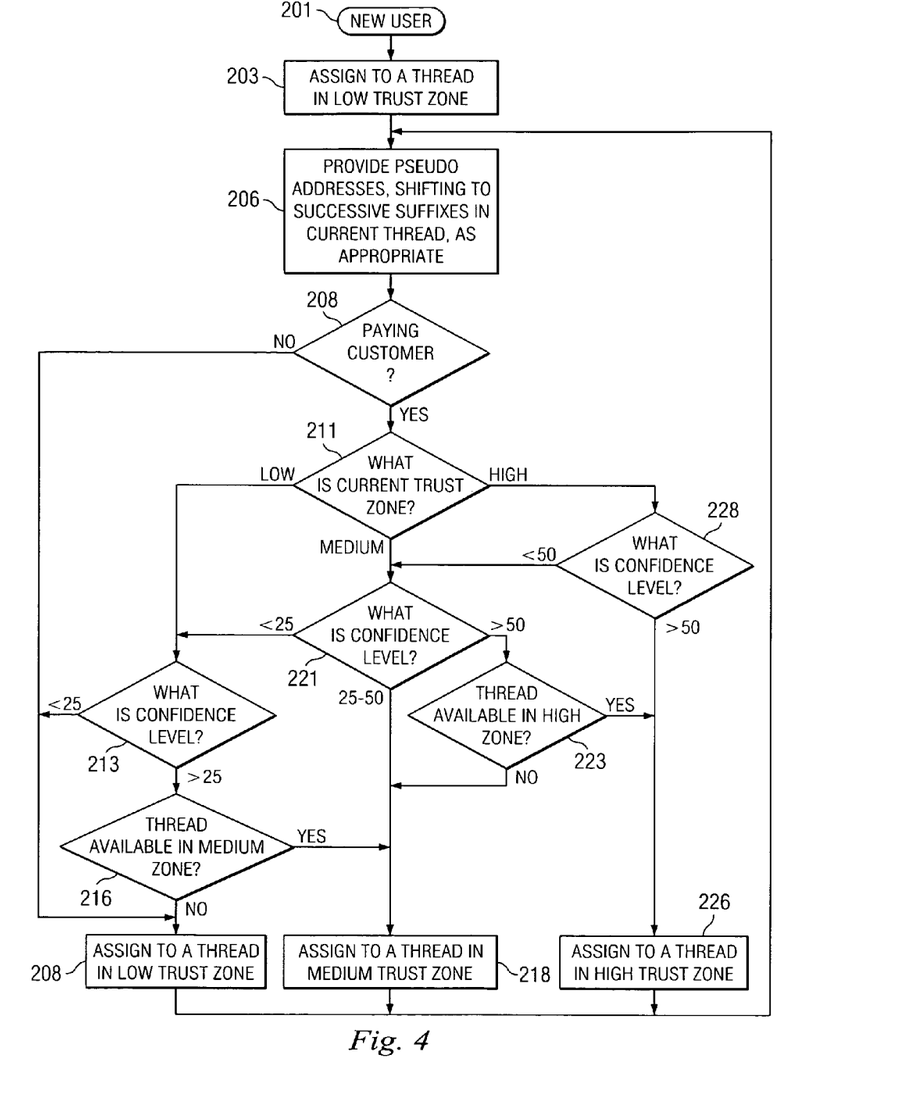
FIG. 4 is a flowchart showing a suffix distribution technique utilized by the electronic system of FIG. 1.

FIG. 4 is a flowchart that summarizes the suffix distribution technique discussed above. The flowchart begins at block 201, where a new user registers with the privacy server 32. Control proceeds to block 203, where the user is assigned to one of the threads 111-113 in the low trust zone 101. As discussed above, this could involve random assignment, load-balancing considerations, or some other factors. Control then proceeds to block 206, where the privacy server 32 provides the user with pseudo e-mail addresses over a period of time, progressing successively through the suffixes in the assigned thread. When the privacy server reaches the end of the currently-assigned thread, control proceeds from block 206 to block 208.

At block 208, the privacy server checks to see whether the user is a customer who pays for the services provided by the privacy server 32. If not, then the user will necessarily remain in the low trust zone 101, and control proceeds to block 208, where the user is assigned to the beginning of one of the threads 111-113 in the low trust zone 101. This may be same thread that the user was on, or a different thread, depending on the technique used to assign threads.

Referring again to block 208, if it is determined that the user is a paying customer, then control proceeds to block 211, where the privacy server checks to see which trust zone the user is currently assigned to. If it is the low trust zone, then control proceeds from block 211 to block 213, where the privacy server 32 calculates the confidence level CL for that particular user, using the equation set forth above. If the confidence level CL is less than 25, then the user is not eligible to move to a higher trust zone, and control proceeds to block 208, where the user is assigned to the beginning of one of the threads 111-113 in the low trust zone. This may be same thread that the user was on, or a different thread, depending on the technique used to assign threads On the other hand, if it is determined at block 213 that the user has a confidence level CL which is at least 25, then control proceeds to block 216. In block 216, the privacy server 32 evaluates whether there is room in the medium trust zone 102 for this user. In this regard, the medium trust zone 102 and the high trust zone 103 are each restricted to a certain maximum number of users. Consequently, if the medium trust zone 102 already contains the maximum number of users, then there will not be an available thread in the medium trust zone. As a result, and despite a confidence level CL of at least 25, control will proceed from block 216 to block 208, where the user will be retained in the low trust zone 101 and will be assigned to the beginning of one of the threads 111-113 in that zone. This may be same thread that the user was on, or a different thread, depending on the technique used to assign threads. On the other hand, if the medium trust zone 102 does not already contain the maximum number of users, then control will proceed from block 216 to block 218, where the user will be assigned to the beginning of one of the threads 121-124 in the medium trust zone 102.

Referring again to block 211, assume that the privacy server 32 determined that the user under evaluation is already in the medium trust zone. Control would therefore proceed to block 221, where the privacy server 32 determines the confidence level CL for the user. If the confidence level CL has dropped from a prior level, such that it is now less than 25, then the user will be shifted from the medium trust zone 102 back to the low trust zone 101, and control will proceed from block 221 to block 213 in order to effect this. On the other hand, if the calculated confidence level CL is in the range of 25 to 50, then the user is eligible to remain in the medium trust zone, and control will proceed from block 221 to block 218 in order to assign the user to the beginning of one of the threads 121-124 in the medium trust zone. This may be same thread that the user was on, or a different thread, depending on the technique used to assign threads.

Still another possibility is that the user will have developed a confidence level CL in excess of 50, and thus may be eligible for entry to the high trust zone 103. In that case, control will proceed from block 221 to block 223, where the privacy server 32 evaluates whether the high trust zone 103 already contains the maximum number of users. If it does, then there will not be an available thread in the high trust zone 103. In that case, control will proceed from block 223 to block 218, where the user under evaluation is retained in the medium trust zone 102, and is assigned to the beginning of one of the threads 121-124 in that zone. This may be same thread that the user was on, or a different thread, depending on the technique used to assign threads. On the other hand, if there is room for the user in the high trust zone 103, then control proceeds from block 223 to block 226, where the user is assigned to the beginning of one of the threads 131-135 in the high trust zone 103.

Referring again to block 221, assume that the privacy server determines that the user under evaluation is already in the high trust zone 103. Control therefore proceeds to block 228, where the privacy server 32 calculates the confidence level CL for the user. If this calculated confidence level CL is at or below 50, then the user needs to be shifted to either the medium trust zone 102, or possibly the low trust zone 101. Accordingly, control would proceed from block 228 to block 221, and then to either block 218 or, through block 213, to block 208. On the other hand, if it is determined at block 228 that the user's confidence level CL is above 50, then control proceeds to block 226, where the user remains in the high trust zone, and is assigned to the beginning of one of the threads 131-135 in that zone. This may be same thread that the user was on, or a different thread, depending on the technique used to assign threads.

One specific embodiment has been illustrated and described in detail, in order to facilitate a clear understanding of the present invention. However, the invention encompasses a variety of variations and modifications of the disclosed embodiment. As one example, the criteria used to assign users to trust zones could be modified to include a time element, for example to require that a new user would not be eligible for the medium trust zone 102 for a time period such as one month, and would not be eligible for the high trust zone 103 for a period such as three months. Other modifications and variations could also be made without departing from the spirit and scope of the present invention, as defined by the following claims.

What is claimed is:

1. An article of manufacture including a non-transitory computer-readable memory medium having instructions stored thereon that, in response to execution by a computing device, cause the computing device to perform operations comprising:
   analyzing a first set of electronic messages addressed to one or more email addresses of a first set of email addresses, wherein the first set of email addresses are assigned to a first user of a privacy service; and
   in response to said analyzing the first set of electronic messages, assigning a trust level to the first user, wherein the assigned trust level affects subsequent assignment of a second set of email addresses to the first user.

2. The article of manufacture of claim 1, wherein the assigned trust level is indicative of a likelihood that the first user is maliciously using the privacy service, and wherein the assigned trust level is used in determining email suffixes used in the second set of email addresses.

3. The article of manufacture of claim 1, wherein the operations further comprise:
   assigning the first set of email addresses to the first user; and
   assigning the second set of email addresses to the first user.

4. The article of manufacture of claim 1, wherein said analyzing the first set includes:
   counting a number D of different domain names that are represented in source addresses of messages of the first set of electronic messages; and
   counting a number R of email addresses of the first set of email addresses that are a destination address of a message of said first set of electronic messages;
   wherein said assigning the trust level to the first user is based at least in part on D, R and N, wherein N is the number of email addresses of said first set of email addresses that have been assigned to the first user.

5. The article of manufacture of claim 4, wherein said assigning the trust level to the first user includes:
   computing a value X based on the expression $X=(R/N)*D$; and
   assigning the trust level based at least in part on the computed value X.

6. The article of manufacture of claim 1,
   wherein the trust level is associated with a corresponding group of one or more suffix threads that comprise one or more suffixes;
   wherein trust levels corresponding to higher levels of trust are associated with corresponding groups having:
   higher numbers of suffix threads per group; and
   lower numbers of suffixes per suffix thread; and
   wherein at least one email address of the second set of email addresses comprises a suffix of the one or more suffixes.

7. An article of manufacture including a non-transitory computer-readable memory medium having instructions stored thereon that, in response to execution by a server system, cause the server system to:
   receive requests for pseudo email addresses; and
   respond to the received requests by:
      generating a current set of pseudo email addresses usable by a first user as pseudo identity information for making purchases from one or more web sites, wherein said current set of email addresses are usable to send electronic messages to the first user, wherein said current set of pseudo email addresses include suffixes from a current group of suffix sets that is selected at least in part based on a trust level currently assigned to the first user, and wherein the trust level is assigned based at least in part on analysis of a set of electronic messages addressed to a set of pseudo email addresses previously assigned to the first user that are usable to send electronic messages to the first user; and
      providing the currently assigned set of pseudo email addresses to the first user.

8. The article of manufacture of claim 7,
   wherein the current group of suffix sets is one of a plurality of groups of suffix sets;
   wherein the plurality of groups of suffix sets correspond respectively to a plurality of trust levels that includes the currently assigned trust level; and
   wherein groups of suffix sets corresponding to higher trust levels have:
   higher numbers of suffix sets per group; and
   lower numbers of suffixes per suffix set.

9. The article of manufacture of claim 7, wherein the instructions are further executable to cause the server system to:
   compute a first value for the first user based on an analysis of email traffic addressed to one or more of the current set of pseudo email addresses; and
   update the currently assigned trust level that is assigned to the first user based at least in part on the first value.

10. The article of manufacture of claim 9, wherein said updating the currently assigned trust level includes determining whether a minimum wait time for email traffic directed to the one or more of the current set of pseudo email addresses has been exceeded; and wherein the requests for the pseudo email addresses are received from the first user.

11. The article of manufacture of claim 9, wherein said updating the currently assigned trust level that is assigned to the first user includes promoting the first user to a higher trust level in response to the first value exceeding a lower limit for the higher trust level.

12. The article of manufacture of claim 9, wherein said updating the currently assigned trust level that is assigned to the first user includes demoting the first user to a lower trust level in response to the first value falling below an upper limit for the lower trust level.

13. The article of manufacture of claim 7, wherein said generating the current set of pseudo email addresses includes accessing said suffixes from a current one of the suffix sets of the current group of suffix sets; and
   wherein the instructions are further executable to cause the server system to update the current group of suffix sets in response to said accessing of said suffixes reaching an end of the current suffix set.

14. The article of manufacture of claim 7, wherein the currently assigned trust level is one of a plurality of trust levels, and wherein non-paying users of the server system are assigned to a lowest trust level of the plurality of trust levels.

15. An article of manufacture including a non-transitory computer-readable memory medium having instructions stored thereon that, in response to execution by a server, cause the server to:
monitor emails that are addressed to one or more of a first set of email addresses allocated to a first user, wherein said first set of email addresses are usable to send emails to the first user, wherein said monitoring includes:
counting a number R of the email addresses of the first set to which at least one of said emails are addressed; and
counting a number D of different domain names represented by source addresses of said emails; and
calculate a confidence level for the first user based at least on the number R, the number D and a number N of said emails, wherein the confidence level affects subsequent allocation of a second set of email addresses to the first user that are usable to send emails to the first user.

16. The article of manufacture of claim 15,
wherein the instructions are further executable to cause the server to allocate the first set of email addresses to the first user; and
wherein said allocating includes selecting domain names from a set of available domain names that are registered to the server.

17. The article of manufacture of claim 15, wherein at least a subset of said emails are sent by one or more entities from whom the first user has made one or more purchases.

18. The article of manufacture of claim 15, wherein the instructions are further executable to cause the server to:
provide the emails to the first user via a computer network.

19. The article of manufacture of claim 16, wherein the set of available domain names comprises a plurality of groups of domain names, and wherein said confidence level is used to determine one of the groups of the plurality of groups of domain names to be assigned to the first user.

20. The article of manufacture of claim 19, wherein the instructions are further executable to cause the server to:
remove, from the set of available domain names, one or more of the groups of the plurality of groups of domain names in response to detecting that the one or more groups have been compromised.

21. A method, comprising:
a computer system analyzing a first set of electronic messages addressed to at least one of a first set of email addresses assigned to a first user of a web-based service, wherein the email addresses are usable as pseudo identity information to be provided by the first user to one or more websites, wherein the email addresses are further usable to send electronic messages to the first user;
in response to said analyzing the first set of electronic messages, the computer system assigning one of a plurality of trust levels to the first user, wherein the assigned trust level is indicative of the degree to which the first user's usage of the web service matches an expected usage pattern of a typical user of the service, and wherein the assigned trust level affects subsequent assignment of a second set of email addresses that are usable to send electronic messages to the first user.

22. The method of claim 21,
wherein the method further comprises assigning the first set of email addresses to the first user; and
wherein said analyzing includes:
counting a number D of different domain names that are represented in source addresses of the first set of electronic messages; and
counting a number R of the first set of addresses that are a destination address of at least one of said first set of electronic messages;
wherein said trust level is assigned based at least in part on D, R and N, wherein N is the number of said first set of email addresses assigned to the first user.

23. A method, comprising:
a computer system receiving requests for pseudo email addresses; and
the computer system responding to the received requests by:
generating a current set of pseudo email addresses usable by a first user as pseudo identity information for making purchases from one or more web sites, wherein said current set of pseudo email addresses is usable to send electronic messages to the first user, wherein said current set of pseudo email addresses include suffixes from a current group of suffix sets that is selected at least in part based on a current trust level assigned to the first user, and wherein the current trust level is assigned based at least in part on analysis of a set of electronic messages addressed to a previous set of pseudo email addresses assigned to the first user usable to send electronic messages to the first user; and
providing the current set of pseudo email addresses to the first user.

24. The method of claim 23 further comprising:
computing a first value for the first user based on an analysis of email traffic addressed to one or more email addresses of the current set of pseudo email addresses; and
updating the current trust level that is assigned to the first user based at least in part on the first value.

25. The method of claim 23, wherein:
said generating the current set of pseudo email addresses includes accessing said suffixes from a current one of the suffix sets of the current group of suffix sets;
the current group of suffix sets is one of a plurality of groups that correspond respectively to a plurality of trust levels; and
groups of suffix sets corresponding to higher trust levels have lower numbers of suffixes per suffix set than groups of suffix sets corresponding to lower trust levels.

26. The method of claim 23, wherein the current trust level assigned to the first user is indicative of a likelihood that the first user is maliciously using the privacy service, and wherein the requests for pseudo email addresses are received from the first user.

* * * * *

UNITED STATES PATENT AND TRADEMARK OFFICE
CERTIFICATE OF CORRECTION

PATENT NO. : 8,250,225 B1
APPLICATION NO. : 10/966361
DATED : August 21, 2012
INVENTOR(S) : Eubanks et al.

It is certified that error appears in the above-identified patent and that said Letters Patent is hereby corrected as shown below:

On Page 2, in Field (56), under "OTHER PUBLICATIONS", in Column 2,
Line 20, delete "Cards. (Mar. 2003)." and insert -- Cards, (Mar. 2003), --, therefor.

In Column 1, Line 7, delete "10/965, 700," and insert -- 10/965,700, --, therefor.

In Column 3, Line 54, delete "13" and insert -- 32 --, therefor.

In Column 5, Line 36, delete "3 S." and insert -- 3S. --, therefor.

In Column 9, Line 65, delete "threads" and insert -- threads. --, therefor.

Signed and Sealed this
Fifth Day of February, 2013

Teresa Stanek Rea
*Acting Director of the United States Patent and Trademark Office*